(12) United States Patent
Cetinich et al.

(10) Patent No.: US 9,727,825 B2
(45) Date of Patent: Aug. 8, 2017

(54) SYSTEM AND METHOD FOR PREDICTING RUNWAY RISK LEVELS USING WEATHER FORECAST DATA AND DISPLAYING MULTIPLE RISK INDICATORS COMPRISING GRAPHICAL RISK INDICATORS

(71) Applicant: The Boeing Company, Chicago, IL (US)

(72) Inventors: Michael R. Cetinich, Englewood, CO (US); Piero A. Chessa, Massa (IT); Giulio Todini, Massa (IT); Anna J. Nilsson, Massa (IT); Ray W. Stovall, San Jose, CA (US); Daniele Pettenuzzo, Massa (IT)

(73) Assignee: The Boeing Company, Chicago, IL (US)

( * ) Notice: Subject to any disclaimer, the term of this patent is extended or adjusted under 35 U.S.C. 154(b) by 507 days.

(21) Appl. No.: 14/323,608

(22) Filed: Jul. 3, 2014

(65) Prior Publication Data
US 2016/0004969 A1    Jan. 7, 2016

(51) Int. Cl.
*G06F 17/00* (2006.01)
*G06N 99/00* (2010.01)

(52) U.S. Cl.
CPC .................................. *G06N 99/005* (2013.01)

(58) Field of Classification Search
CPC .......... G06N 5/04; G08G 5/0039; G08G 5/00; G08G 5/0043
USPC .............................................. 706/12, 45, 62
See application file for complete search history.

(56) References Cited

U.S. PATENT DOCUMENTS

| 6,992,626 | B2 | 1/2006 | Smith | |
|---|---|---|---|---|
| 7,129,857 | B1* | 10/2006 | Spirkovska | G01W 1/00 340/971 |
| 7,437,250 | B2* | 10/2008 | Breen | E01C 23/00 404/17 |
| 7,908,077 | B2* | 3/2011 | Smith | G06Q 10/10 340/945 |
| 2011/0301829 | A1* | 12/2011 | White | G08G 5/0043 701/120 |
| 2014/0278615 | A1* | 9/2014 | Ince | G06Q 10/025 705/6 |

FOREIGN PATENT DOCUMENTS

EP    2 423 816 A1    2/2012

OTHER PUBLICATIONS

Li et al., Airport Configuration Planning With Uncertain Weather and Noise Abatement Procedures IEEE, 2010, pp. 1-9.*

* cited by examiner

*Primary Examiner* — David Vincent
(74) *Attorney, Agent, or Firm* — Toler Law Group, PC (57) ABSTRACT

A method includes receiving meteorological forecast data at an electronic device. The method includes predicting multiple risk levels associated with an aircraft using one or more runways of an airport during a forecast time interval based on the meteorological forecast data. The method further includes generating a graphical user interface (GUI) that includes multiple risk indicators based on the multiple risk levels. The multiple risk indicators may correspond to multiple time sub-intervals during the forecast time interval.

20 Claims, 6 Drawing Sheets

SYSTEM AND METHOD FOR PREDICTING RUNWAY RISK LEVELS USING WEATHER FORECAST DATA AND DISPLAYING MULTIPLE RISK INDICATORS COMPRISING GRAPHICAL RISK INDICATORS

FIELD OF THE DISCLOSURE

The present disclosure relates to a system and method for predicting risk levels associated with airport runways.

BACKGROUND

Air traffic controllers and/or flight dispatchers use forecasted weather data to schedule flights at runways of airports. For example, when an air traffic controller or a flight dispatcher is generating a flight schedule for a particular airport, the air traffic controller or dispatcher may schedule a particular runway for a takeoff or a landing based on a weather prediction at the particular runway at a scheduled time. The air traffic controller or flight dispatcher may consult deterministic model meteorological data or ensemble prediction system data to predict a weather condition for the particular runway at the scheduled time for use in generating the flight schedule.

However, current forecast systems provide either a deterministic model output (e.g., a predicted data value) or ensemble prediction system data (e.g., a plurality of predicted values based on varied initial conditions). The current forecast system outputs may not provide enough information in an easy-to-interpret form for use in generating the flight schedule. For example, the deterministic model may generate a single predicted value (e.g., a deterministic wind value) without indicating a likelihood that the value will occur. As another example, the ensemble prediction system data may provide a large amount of predicted values, but such an output may be confusing to an air traffic controller or flight dispatcher and may not take into account a type of aircraft being scheduled for a takeoff or a landing. Additionally, the current forecast system outputs are provided for short-term intervals into the future for a specified location (e.g., the particular runway). Thus, the current forecast systems do not enable an air traffic controller or a flight dispatcher to quickly and easily generate a flight schedule based on predicted weather conditions for a medium-term or long-term interval into the future.

SUMMARY

A system and method for predicting risk levels due to future weather conditions at airport runways are disclosed. Weather-related risk levels associated with aircraft using (e.g., taking off from or landing at) one or more runways at an airport may be predicted for multiple different types of aircraft at different times based on meteorological forecast data. For example, risk levels may be predicted based on predicted cross-winds at the one or more runways. Predicted risk level information may be displayed to a user via a single, easy-to-interpret graphical user interface (GUI). For example, the GUI may display multiple risk indicators. Each risk indicator may indicate a risk level associated with an aircraft of a corresponding aircraft type using the one or more runways during a corresponding sub-interval of a forecast time interval. To illustrate, the multiple risk indicators may be color-coded to indicate the corresponding predicted risk levels. Risk indicators corresponding to different aircraft types and to multiple time sub-intervals (e.g., time steps) of the forecast time interval may be concurrently displayed, thus enabling a user (e.g., an air traffic controller or a flight dispatcher) to compare risk levels for different aircraft types during a particular sub-interval, or to compare risk levels for a particular aircraft type during different sub-intervals. Additionally, the GUI may display data for a medium-term interval or a long-term forecast time interval, such as a three or more day interval. Thus, the user may quickly and easily generate a flight schedule for multiple days into the future for the airport using the GUI.

In a particular embodiment, a method includes receiving meteorological forecast data at an electronic device. The method includes predicting multiple risk levels associated with an aircraft using one or more runways of an airport during a forecast time interval based on the meteorological forecast data. The method further includes generating a graphical user interface (GUI) that includes multiple risk indicators based on the multiple risk levels. The multiple risk indicators may correspond to multiple time sub-intervals (e.g., steps) during the forecast time interval.

In another particular embodiment, an apparatus includes a processor and a memory coupled to the processor. The memory stores instructions that, when executed by the processor, cause the processor to perform operations including receiving meteorological forecast data. The operations also include predicting multiple risk levels associated with an aircraft using one or more runways of a selected airport during a forecast time interval based on the meteorological forecast data. The operations further include generating a graphical user interface (GUI) that includes multiple risk indicators based on the multiple risk levels. The multiple risk indicators may correspond to multiple time sub-intervals (e.g., steps) during the forecast time interval.

In another particular embodiment, a computer-readable storage device stores instructions that, when executed by a processor, cause the processor to perform operations including receiving meteorological forecast data. The operations also include predicting multiple risk levels associated with an aircraft using one or more runways of a selected airport during a forecast time interval based on the meteorological forecast data. The operations further include generating a graphical user interface (GUI) that includes multiple risk indicators based on the multiple risk levels. The multiple risk indicators may correspond to multiple time sub-intervals (e.g., steps) during the forecast time interval.

The features, functions, and advantages that have been described can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

Figure 1:
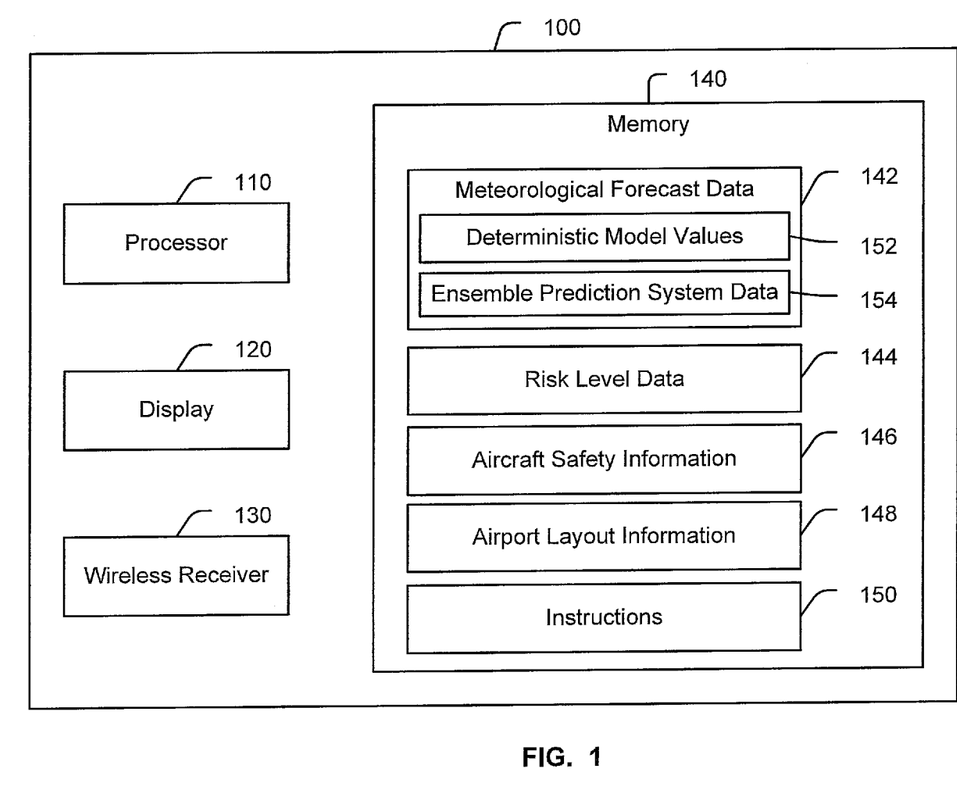
FIG. 1 is a block diagram that illustrates a particular embodiment of an electronic device configured to predict risk levels associated with airport runways.

Referring to FIG. 1, a diagram illustrating a particular embodiment of an electronic device configured to predict risk levels associated with airport runways is shown and generally designated 100. As shown in FIG. 1, the electronic device 100 includes a processor 110, a display device 120, a wireless receiver 130, and a memory 140. In a particular embodiment, the electronic device 100 may be a portable device such as a cellular telephone or a tablet computer, configured for use as an air traffic control device or a flight dispatch device. In another embodiment, the electronic device 100 may be integrated with a control panel of an air traffic control tower (e.g., an air traffic control system) or with a flight dispatch control system. In a particular embodiment, the display device 120 may be separate from the electronic device 100. The display device 120 may be coupled to the electronic device 100 and may be configured to display risk level information associated with airport runways. The memory 140 may store meteorological forecast data 142, risk level data 144, aircraft safety information 146, airport layout information 148, and instructions 150. In other embodiments, the meteorological forecast data 142, the aircraft safety information 146, and the airport layout information 148 may be used by the processor 110 to perform operations described further herein without being stored at the memory 140. The instructions 150 may include instructions that, when executed by the processor 110, cause the processor 110 to predict risk levels associated with airport runways according to the various embodiments described with reference to FIGS. 1-6.

The meteorological forecast data 142 may include global meteorological forecasts and/or forecast data received by the electronic device 100 one or more times each day. In a particular embodiment, the meteorological forecast data 142 includes data corresponding to forecasted cross-winds. In other embodiments, the meteorological forecast data 142 may include forecast information related to other weather conditions, such as forecasted precipitation information, forecasted temperature information, etc. The meteorological forecast data 142 may include deterministic model values 152 and ensemble prediction system data 154. The deterministic model values 152 may be received from a deterministic meteorological model system and may include one or more forecasted values. For example, the deterministic model values 152 may include one or more forecasted cross-wind values. The ensemble prediction system data 154 may be received from one or more ensemble prediction systems and may include a data set (e.g., a plurality of data members) based on at least one data model, such as an atmospheric forecast model. In a particular embodiment, the ensemble prediction system data 154 may be received from the European Center for Medium-Range Weather Forecasting (ECMWF). In other embodiments, the ensemble prediction system data 154 may be received from other ensemble prediction systems. In a particular embodiment, the ensemble prediction system data 154 may include fifty data members and a control forecast based on a particular atmospheric forecast model with varied initial conditions.

The aircraft safety information 146 may include safety information related to multiple aircraft types. For example, the aircraft safety information 146 may include cross-wind rating information related to multiple aircraft types. In a particular embodiment, the aircraft safety information 146 may include sets of threshold values associated with the multiple aircraft types. In other embodiments, the aircraft safety information 146 may include information used to determine the sets of threshold values. The aircraft safety information 146 may be based on information included in one or more aircraft manuals. For example, the aircraft safety information 146 may include safety ratings, threshold values, and/or other information from multiple aircraft manuals associated with the multiple aircraft types. To illustrate, an aircraft manual associated with a particular aircraft type may indicate that an aircraft of the particular aircraft type is unsafe to operate when predicted cross-wind values are above a threshold value of 17 knots (kts). Additionally or alternatively, the aircraft safety information 146 may be based on user input. For example, a user may enter or modify the aircraft safety information 146 via a user input device, and the modified aircraft safety information 146 may be stored at the memory 140. To illustrate, the user may modify a threshold value associated with a particular aircraft type by decreasing the threshold. Decreasing the threshold may cause a warning to be generated when predicted cross-wind values reach values that cause passenger discomfort or distress (e.g., the reduced threshold value) but that do not reach the safety threshold value.

The airport layout information 148 may include information indicating layouts of runways at one or more airports. For example, the airport layout information 148 may include a direction, a location (e.g., coordinates), a length, an altitude, etc., for each runway at the one or more airports. The airport layout information 148 may be received from an airport layout information database and stored at the memory 140. The airport layout information 148 may be used by the processor 110 to generate cartographic information, such as a map of a selected airport and visual representations of runways, as further described with reference to FIG. 2.

During operation, the electronic device 100 may be configured to receive the meteorological forecast data 142 (e.g., from a deterministic meteorological model system and an ensemble prediction system) and to predict the multiple risk levels based on the meteorological forecast data 142. The multiple risk levels may be predicted for a selected airport. For example, the electronic device 100 may receive a selection of the selected airport via a user input and may retrieve information (e.g., the airport layout information 148) that is associated with the selected airport from the airport layout information database.

The risk level data 144 may indicate multiple risk levels that correspond to multiple time sub-intervals (e.g., steps) during a forecast time interval and to multiple aircraft types. For example, each risk level may indicate a predicted risk associated with an aircraft of a corresponding aircraft type using (e.g., taking off from or landing at) a runway of the selected airport during a corresponding sub-interval of the forecast time interval. To illustrate, a first risk level indicates a predicted risk level associated with an aircraft of a first aircraft type performing a takeoff or a landing during a first sub-interval at one of the runways of the selected airport. In a particular embodiment, the runway may be a user-selected runway, as further described with reference to FIG. 2. In another embodiment, the runway may be a highest risk runway during the corresponding sub-interval, as further described with reference to FIG. 2.

In a particular embodiment, the forecast time interval may include a medium-term interval or a long-term interval. For example, the forecast time interval may have a length of three days (e.g., a medium-term interval). As another example, the forecast time interval may have a length of ten days (e.g., a long-term interval). In other embodiments, the forecast time interval may have different lengths, including a short-term interval (e.g., a length less than one day). Additionally, the forecast time interval may be set by a user. For example, the electronic device 100 may modify the forecast time interval based on a user input indicating a selected forecast interval duration.

Each sub-interval of the forecast time interval may represent a portion (e.g., a time step) of the forecast time interval. For example, each sub-interval may represent one hour. As another example, each sub-interval may represent three hours. In other examples, the sub-intervals may represent other durations. To illustrate, the forecast time interval may be five days, and risk levels may be predicted for each three hour portion (e.g., each sub-interval) of the forecast time interval. Durations of the sub-intervals may be selected or modified based on user input. For example, the electronic device 100 may receive a user input indicating a selected sub-interval duration, and the multiple sub-intervals may be modified based on the selected sub-interval duration. By enabling user modification of the forecast time interval and the multiple sub-intervals of the forecast time interval, the electronic device 100 may enable display of multiple predicted risk levels for a user-selected time interval, including medium-term or long-term intervals, on a single display, as further described with reference to FIG. 2.

The electronic device 100 may predict the multiple risk levels (indicated by the risk level data 144) based on the meteorological forecast data 142 and the airport layout information 148. For example, the electronic device 100 may predict forecasted cross-wind values associated with one or more runways of the selected airport based on the meteorological forecast data 142. The forecasted cross-wind values may be predicted for each sub-interval of the multiple sub-intervals (of the forecast time interval). In a particular embodiment, the forecasted cross-wind values may be predicted based on the deterministic model values 152 and the ensemble prediction system data 154. Additionally, the forecasted cross-wind values may be predicted based on information associated with one or more runways of the selected airport. For example, a forecasted cross-wind value may be predicted for each runway at the selected airport based on a predicted wind during a corresponding sub-interval, a direction of the predicted wind, and directions of the runways.

After predicting the forecasted cross-wind values, the electronic device 100 may predict the multiple risk levels based on the predicted cross-wind values for multiple aircraft types at the one or more runways of the selected airport. To illustrate, the electronic device 100 may predict a first risk level associated with an aircraft of a first aircraft type using a particular runway (e.g., a user-selected runway or a highest risk runway) of the selected airport during a first sub-interval. To predict the first risk level, forecasted cross-wind values at the particular runway during the first sub-interval may be determined based on the meteorological forecast data 142 and the airport layout information 148, as described above, and the forecasted cross-wind values may be compared to a threshold associated with the first aircraft type (e.g., a safety-related threshold). The first risk level may be predicted based on whether the forecasted cross-wind values exceed the threshold. The prediction may be performed using a runway risk index algorithm, as further described with reference to FIG. 4. Additional risk levels may be predicted in a similar manner. For example, additional risk levels corresponding to the first aircraft type may be similarly predicted during different sub-intervals of the multiple sub-intervals. Additionally, risk levels corresponding to different aircraft types may be predicted for the multiple sub-intervals.

After the electronic device 100 predicts the multiple risk levels indicated by the risk level data 144, the electronic device 100 may generate a display based on the multiple risk levels. In a particular embodiment, the electronic device 100 may initiate display of a graphical user interface (GUI) at the display device 120. The GUI may include multiple risk indicators based on the multiple risk levels. For example, the multiple indicators may provide a visual representation of the multiple risk levels indicated by the risk level data 144. In a particular embodiment, the visual representation may be a block displayed in the GUI. The block may be color-coded based on a risk level associated with the risk indicator, as further described with reference to FIG. 2. The visual representation may enable a user to compare risk levels between different aircraft types during a particular sub-interval, between different sub-intervals for a particular aircraft type, or between different aircraft types during different sub-intervals. The GUI may include additional information, such as a map of the selected airport that includes visual representations of runways, one or more deterministic cross-wind values (e.g., the predicted cross-wind values), or a combination thereof. The GUI is described in further detail with reference to FIG. 2.

In addition to displaying the GUI, the electronic device 100 may perform a calibration process to improve accuracy of future predictions. For example, the electronic device 100 may perform the calibration process based on the multiple risk levels indicated by the risk level data 144, climatological data, and monitored data received at the electronic device 100. In a particular embodiment, the climatological data may include measured data, re-analysis data, and "hindcast" data (e.g., climatology model data). The climatological data may be received from a global climatological data supplier or from other sources. In a particular embodiment, the monitored data may include "near real-time data", such as weather station data (e.g., surface synoptic observations (SYNOP) data, Meteorological Terminal Aviation Routine (METAR) weather report data, buoy-monitored weather data, ship-monitored weather data, or a combination thereof) and area data (e.g., satellite-monitored weather data, radar-derived weather data, or a combination thereof). One or more steps of predicting the multiple risk levels may be calibrated based on the climatological data, the monitored data, or a combination thereof, to increase accuracy of the predictions. For example, a predicted value (e.g., a predicted cross-wind value) for a particular sub-interval may be compared to a measured value during the particular sub-interval and, based on the comparison, one or more calibrations may be determined that cause the predicted value to more closely conform to the measured value. The one or more calibration may be applied to methods and/or calculations used to generate predicted values to increase accuracy of the methods and/or calculations.

By generating a GUI that displays multiple risk indicators indicating the multiple risk levels, the electronic device 100 enables a user to quickly interpret predicted risk information using a single, easy-to-use display. Such information may be used by an air traffic controller or a flight dispatcher to generate a flight schedule that reduces risks to scheduled flights. Additionally, the information may enable more flexible scheduling. For example, instead of closing a particular runway for all aircraft types based on a predicted wind value, the particular runway may be scheduled for use by a subset of aircraft types when predicted risk levels corresponding to the subset of aircraft types are within a target risk range. Additionally, the electronic device 100 may provide predictions of risk levels for three or more days in advance, thereby enabling generation of medium-term or long-term flight schedules, as compared to conventional forecasting systems that provide a predicted wind value for a target time period within a short-term interval and do not predict risk levels corresponding to different sub-intervals or to different aircraft types.

Figure 2:
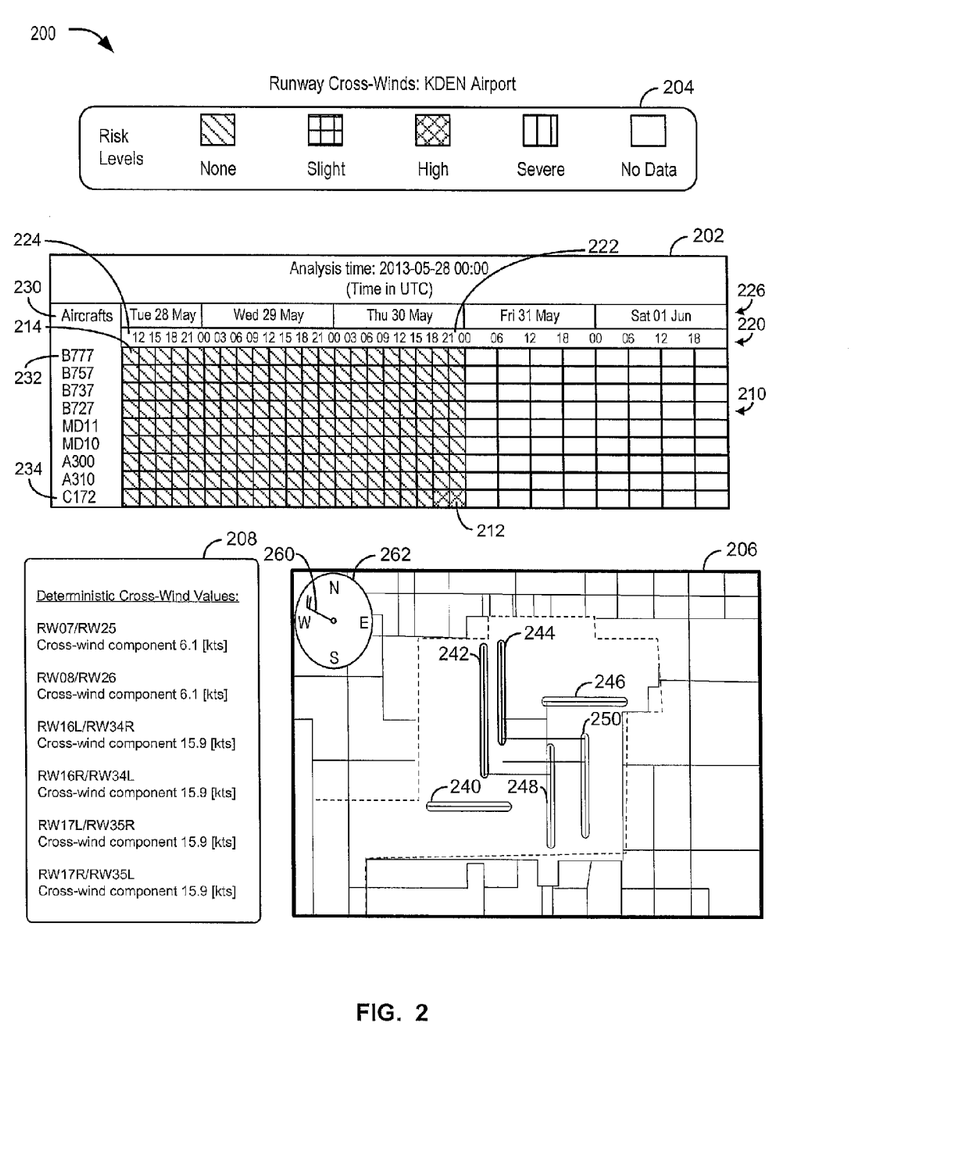
FIG. 2 is a diagram of a graphical user interface (GUI) generated by the electronic device of FIG. 1.

Referring to FIG. 2, a diagram of a graphical user interface (GUI) 200 generated by the electronic device of FIG. 1 is shown. The GUI 200 may be generated by the electronic device 100 and displayed via the display device 120 of FIG. 1. In FIG. 2, a dashboard element 202, a legend element 204, a map 206, and a deterministic value element 208 are shown. In a particular embodiment, the dashboard element 202, the legend element 204, the map 206, and the deterministic value element 208 may be displayed concurrently via the GUI 200.

The information displayed by the GUI 200 may be associated with a selected airport. For example, the electronic device 100 of FIG. 1 may receive a user input indicating the selected airport, and the GUI 200 may display information associated with the selected airport. A different airport may be selected at a different time, and the GUI 200 may be updated to display information associated with the different airport. In a particular embodiment, the electronic device 100 of FIG. 1 may be communicatively coupled to a database that includes information associated with a plurality of airports (e.g., the airport layout information 148), and the GUI 200 may display information associated with any selected airport from the database.

As shown in FIG. 2, the dashboard element 202 may include multiple risk indicators 210. The dashboard element 202 may be a grid display element where labels associated with multiple aircraft types 230 are displayed in a first direction (e.g., vertically) and labels associated with multiple sub-intervals 220 are displayed in a second direction (e.g., horizontally). The multiple risk indicators 210 may be visual representations of the multiple risk levels indicated by the risk level data 144 of FIG. 1. In a particular embodiment, the visual representations may be colored blocks displayed in the GUI 200. Each of the multiple risk indicators 210 may correspond to one of the multiple sub-intervals 220 of a forecast time interval 226. In a particular embodiment, the forecast time interval may represent a five day duration and the multiple sub-intervals 220 may represent three hour durations, as illustrated in FIG. 2. In other embodiments, the forecast time interval and the multiple sub-intervals 220 may have different durations and/or may be modified based on user input, as described with reference to FIG. 1. Additionally, each of the multiple risk indicators 210 may correspond to one of the multiple aircraft types 230. For example, a first risk indicator 212 may correspond to a first sub-interval 222 (Thu May 30 from 21:00-00:00) and to a first aircraft type 232 (C172). A second risk indicator 214 may correspond to a second sub-interval 224 (Tue May 28 from 9:00-12:00) and to a second aircraft type 234 (B777). Accordingly, each of the multiple risk indicators 210 represents a risk level associated with an aircraft of a corresponding aircraft type of the multiple aircraft types 230 using a runway of the selected airport during a corresponding sub-interval of the multiple sub-intervals 220.

The multiple risk indicators 210 may be color-coded to indicate the multiple risk levels. For example, a first color of the first risk indicator 212 indicates a risk level associated with an aircraft of the first aircraft type 232 using a particular runway of the selected airport during the first time interval 222. A risk level corresponding to each color may be displayed in the legend element 204. In a particular embodiment, the risk levels may include "none," "slight," "high," "severe," and "no data." In other embodiments, other risk levels may be used. For example, the first color may indicate, a high risk level for the aircraft of the first aircraft type 232 to use the particular runway during the first sub-interval 222. As another example, a second color of the second risk indicator 214 may indicate a risk level of "none" (e.g., a negligible risk) for an aircraft of the second aircraft type 234 to use the particular runway during the second sub-interval 224.

In a particular embodiment, the colors of the multiple risk indicators 210 may indicate risk levels associated with aircraft using a user-selected runway at the selected airport. For example, the electronic device 100 of FIG. 1 may receive a user input indicating a user-selected runway, and the colors of the multiple risk indicators 210 may indicate risk levels corresponding to the user-selected runway. Alternatively, the colors of the multiple risk indicators 210 may be associated with a highest-risk runway of the selected airport for a corresponding aircraft type during a corresponding sub-interval. To illustrate, the selected airport may include six runways, and the color of the multiple risk indicators 210 may indicate a highest risk level among risk levels associated with the six runways for a corresponding aircraft type during the corresponding sub-interval. For example, the first color of the first risk indicator 212 may indicate a high risk level when four runways are associated with a high risk level and two runways are associated with a risk level of "none." In this example, the first color indicates the high risk level because high is the highest risk level among the six risk levels associated with the six runways. As another example, the second color of the second risk indicator 214 may indicate a risk level of "none" when each of the six runways is associated with the risk level of "none" for a corresponding aircraft type during a corresponding sub-interval.

To provide additional levels of detail, the GUI 200 includes the map 206. The map 206 displays a visual representation of the selected airport, including visual representations of runways. As illustrated in FIG. 2, the map 206 includes visual representations of runways 240-250 of the selected airport. The map 206 may be generated based on airport information (e.g., the airport layout information 148 of FIG. 1), which may include information indicating locations and directions of the runways 240-250. The map 206 shown in FIG. 2 is for convenience only, and in other embodiments different airports with different runways may be displayed or additional or fewer visual elements may be included in the map 206.

In a particular embodiment, the map 206 displays information related to a sub-interval and an aircraft type that correspond to a selected risk indicator of the multiple risk indicators 210. In a particular embodiment, a user may select the first risk indicator 212 by selecting the first risk indicator 212 with a mouse or other user input device. In another embodiment, the GUI 200 may include navigation buttons, and the user may select the first risk indicator using the navigation buttons. Responsive to selection of the first risk indicator 212, the map 206 may be updated to display information associated with the first risk indicator 212. For example, colors of the runways 240-250 may indicate corresponding risk levels associated with an aircraft of the first aircraft type 232 using the runways 240-250 during the first sub-interval 222. The colors of the runways 240-250 may be selected from among the colors displayed in the legend element 204. In a particular embodiment, one or more of the runways 240-250 may be displayed with black contour around the runway to indicate a risk level that exceeds a minimum alert level, as described further with reference to FIG. 4.

In another embodiment, the map 206 displays information for a most "sensible" aircraft type of the multiple aircraft types 230 when none of the multiple risk indicators 210 are selected. For example, the map 206 may display information associated with a risk indicator having a lowest risk level during an earliest sub-interval (e.g., the second sub-interval 224). If multiple risk indicators have the same lowest risk level, the map 206 may display information associated with a top-most risk indicator of the multiple risk indicators having the same lowest risk value. For example, the map 206 may display information associated with the second risk indicator 214 when no risk indicator is selected.

Additionally, the GUI 200 may display the deterministic value element 208 to the left of the map 206. The deterministic value element 208 may include deterministic cross-wind values associated with each of the runways displayed in the map 206. For example, when the first risk indicator 212 is selected, the deterministic value element 208 may include six deterministic cross-wind values associated with six runways 240-250. The deterministic cross-wind values may be generated based on deterministic meteorological model data, such as the deterministic model values 152 of FIG. 1. The deterministic cross-wind values represent predicted cross-wind values during a corresponding sub-interval for the runways 240-250. Additionally or alternatively, the map 206 may include a wind direction indicator 260 in a compass 262. The wind direction indicator 260 may illustrate a strength and direction of a predicted wind at the selected airport at the first sub-interval 222. In another embodiment, the map 206 may include a graphical wind representation representing one or more cross-winds at the selected airport at the first sub-interval 222.

Although the GUI 200 is illustrated in FIG. 2 as displaying a single map (e.g., the map 206), in other embodiments the GUI 200 may display multiple airport maps concurrently. For example, the GUI 200 may display the map 206 (e.g., a first map of a first airport), a second map of a second airport, and a third map of a third airport. Although three airport maps are described, in other embodiments any number of airport maps may be displayed. The second map and the third map may each display runway risk levels associated with one or more corresponding runways, in a similar manner to the map 206. In this example, the second airport and the third airport may be within a rerouting distance of the first airport. As a particular example, the first airport may represent Denver airport, the second airport may represent Pueblo airport, and the third airport may represent Colorado Springs airport. By displaying multiple airport maps concurrently, the GUI 200 may enable the user (e.g., the dispatcher or the flight controller) to divert a route of a particular aircraft from the first airport to a different airport based on risk levels at the runways of each airport. For example, if each runway at the Denver airport exceeds a particular risk level, the user may determine to reroute the particular aircraft to a runway at the Colorado Springs airport that does not exceed the particular risk level, based on information presented via the GUI 200.

In another particular embodiment, the labels associated with the multiple aircraft types 230 in the dashboard element 202 of the GUI are replaced with labels associated with multiple runways. For example, the dashboard element 202 may include labels of multiple runways from multiple airports that are displayed in the vertical direction. In this particular embodiment, the multiple risk indicators 210 may indicate a "general" risk level that is not specific to an aircraft type. For example, each of the multiple risk indicators 210 may represent a general risk level that corresponds to one of the multiple sub-intervals 220 of the forecast time interval 226 and to one of the multiple runways. In this particular embodiment, the map 206 may not be displayed. The user may be able to determine when one or more runways should be opened or closed (based on risk levels) during the forecast time interval 226 using information displayed via the dashboard element 202.

Because prediction information (e.g., the multiple risk indicators 210, the map 206, and the deterministic value element 208) is displayed in a single, easy-to-use GUI 200, a user of the electronic device 100 may be able to generate flight schedules quicker and with less effort as compared to using conventional forecast systems. For example, the user may be able to identify times (e.g., time steps or sub-intervals) when certain aircraft types are associated with an undesirable risk level by looking at the dashboard element 202. Additionally, the dashboard element 202 may display information for a longer time period than other systems, such as for a medium-term period or a long-term period. The GUI 200 also provides detailed information via that map 206, such as risk levels associated with each runway of a selected airport, and deterministic values via the deterministic value element 208, enabling flights to be scheduled on a per-runway basis.

Figure 3:
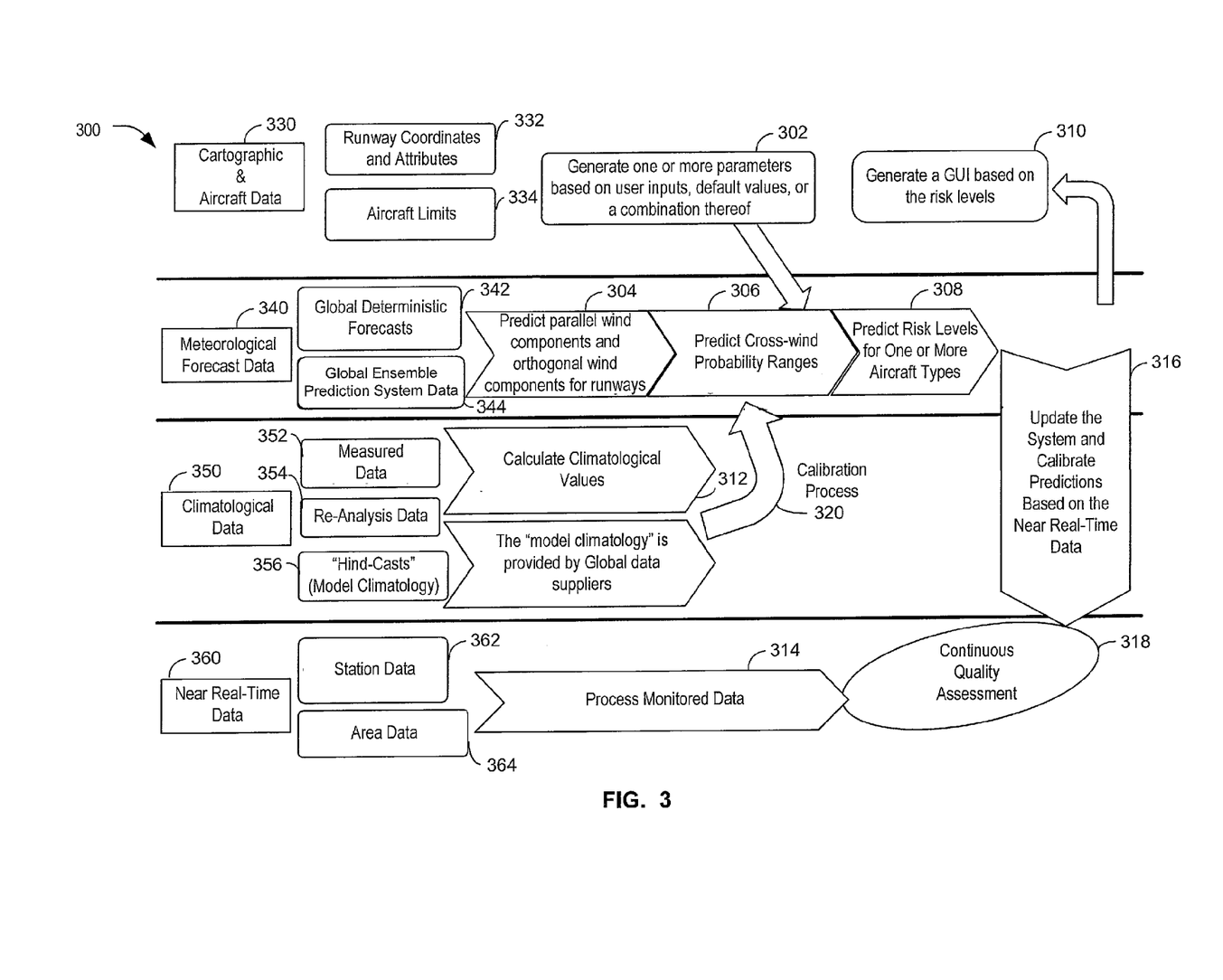
FIG. 3 is a diagram of a particular embodiment of a process of predicting runway risk levels.

FIG. 3 illustrates a particular embodiment of a process 300 of predicting runway risk levels. The process 300 may be performed by the electronic device 100 of FIG. 1. For example, the process 300 may be performed to predict the multiple risk levels indicated by the risk level data 144 of FIG. 1 and to display the GUI 200 including the risk indicators 210 of FIG. 2.

The process 300 includes generating one or more parameters based on one or more user inputs, default values, or a combination thereof, at 302. The one or more user inputs may be received from a user input device and may indicate selection of one or more values to be used as the one or more parameters during the process 300. For example, the one or more user inputs may indicate a duration of a forecast time interval, durations of multiple time sub-intervals (e.g., steps) during the forecast time interval, a user-selected airport, a user-selected runway, modifications to safety information, or other information. Additionally, the one or more parameters may be generated based on default values. For example, the default parameters may be received from a database. In a particular embodiment, the database may include cartographic and aircraft data 330. In other embodiments, the cartographic and aircraft data 330 may be stored in a memory. The cartographic and aircraft data 330 may include runway coordinates and attributes 332 and aircraft limits 334. For example, the runway coordinates and attributes 332 may include or correspond to the airport layout information 148, and the aircraft limits 334 may include or correspond to the aircraft safety information 146.

The process 300 further includes predicting parallel wind components and orthogonal wind components for runways of a selected airport, at 304. The parallel wind components and the orthogonal wind components may be predicted based on meteorological forecast data 340 that includes global deterministic forecasts 342 and global ensemble prediction system data 344. For example, the meteorological forecast data 340 may include or correspond to the meteorological forecast data 142, the global deterministic forecasts 342 may include or correspond to the deterministic model values 152, and the global ensemble prediction system data 344 may include or correspond to the ensemble prediction system data 154 of FIG. 1, respectively. The parallel wind components and the orthogonal wind components may be predicted at selected times during a forecast time interval. For example, the parallel wind components and the orthogonal wind components may be predicted for the multiple sub-intervals 220 during the forecast time interval 226 of FIG. 2. Prediction of the parallel wind components and of the orthogonal wind components may be calibrated, as further described below.

The process 300 further includes predicting cross-wind probability ranges, at 306. The predicted cross-wind probability ranges may be predicted based on the parallel wind components, the orthogonal wind components, and the global ensemble prediction system data 344. The cross-wind probability ranges are further described with reference to FIG. 4.

The process 300 further includes predicting risk levels for one or more aircraft types based on thresholds and on the one or more parameters (generated at 302), at 308. For example, the risk levels may include or correspond to the multiple risk levels indicated by the risk level data 144 of FIG. 1. The thresholds may be one or more thresholds included in the aircraft limits 334. Additionally, the thresholds may be modified based on user input. In a particular embodiment, the one or more thresholds are associated with cross-wind safety ratings for the one or more aircraft types.

The process 300 further includes generating a GUI based on the risk levels, at 310. For example, the process 300 may include generating and displaying the GUI 200 of FIG. 2. The GUI may include multiple risk indicators based on the risk levels. Displaying the multiple risk indicators may enable a user to quickly identify risk levels associated with one or more aircraft types at different times during a forecast time interval, as described with reference to FIG. 2. Additionally, the GUI may also include detailed information, such as a map of a selected airport and deterministic cross-wind values, as further described with reference to FIG. 2.

In a particular embodiment, the process 300 further includes calculating climatological values, at 312. The climatological values may be calculated based on climatological data 350. The climatological data 350 may include measured data 352, re-analysis data 354, and "hind-casts" (e.g., model climatology) 356. In a particular embodiment, the measured data 352 may include data measured for at least thirty years. In another particular embodiment, the hind-casts 356 may be received from one or more global data suppliers, such as the ECMWF. The climatological model data may be used to calibrate one or more of the models, formulas, or calculations used to predict the cross-wind probability ranges and the risk levels during a calibration process 320. The calibration process 320 may adjust the one or more models, formulas, or calculations used to predict values such that future predictions generated using the one or more models, formulas, or calculations have increased accuracy as compared to predictions generated based on uncalibrated models. The calibration process 320 may be optional (e.g., may not occur in other embodiments).

The process 300 includes receiving monitored data, at 314. The monitored data may include "near real-time" data 360 that includes station data 362 and area data 364. For example, the station data 362 may include weather station data, such as surface synoptic observations (SYNOP) data, Meteorological Terminal Aviation Routine (METAR) weather report data, buoy-monitored weather data, ship-monitored weather data, or a combination thereof, and the area data 364 may include satellite-monitored weather data, radar-derived weather data, or a combination thereof. In a particular embodiment, the near real-time data 360 may include data associated with at least the three previous days.

The process 300 may further include updating the system and calibrating predictions based on the near real-time data 360, at 316. For example, the predicted parallel wind components, the predicted orthogonal wind components, the predicted cross-wind probability ranges, and/or the predicted risk levels may be compared to the near real-time data 360 and one or more models, formulas, or calculations used in generating the predicted values may be modified based on the comparisons. Modifying the one or more models, formulas, or calculations may improve an accuracy of future predictions generated using the one or more models, formulas, or calculations. In a particular embodiment, the calibration and system updating may be performed multiple times per day, such as two or four times per day. Updating the system may be part of a continuous quality assessment 318 performed to improve accuracy of forecasts and predictions generated by the system. Thus, the process 300 may be performed to generate and display a GUI that displays more accurate weather-related risk prediction information than conventional forecast systems.

Figure 4:
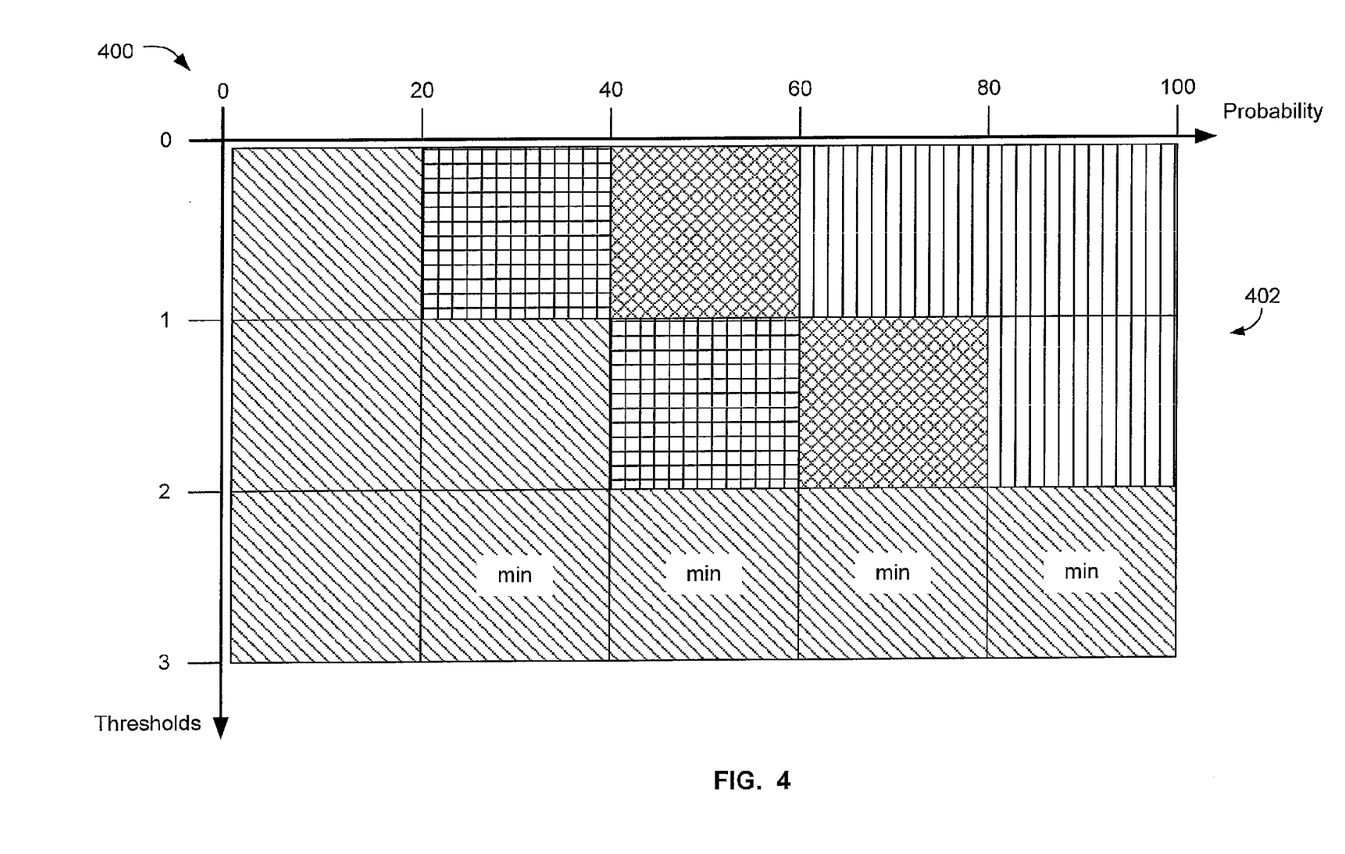
FIG. 4 is a diagram that illustrates a particular embodiment of a runway risk index algorithm.

FIG. 4 illustrates a particular embodiment of a runway risk index algorithm 400. The runway risk index algorithm 400 may be used by the electronic device 100 of FIG. 1 during prediction of the multiple risk levels indicated by the risk level data 144. A first risk level associated with a first aircraft type at a first time for a first runway of a selected airport may be predicted using the runway risk index algorithm 400. For example, the first risk indicator 212 of FIG. 2 may be predicted using the runway risk index algorithm 400. Using the runway risk index algorithm 400 to predict the first risk indicator 212 may enable a more accurate prediction than using other forecasting systems.

When referring to weather forecasts, accuracy (e.g., quality) may depend on two factors: initial condition accuracy and an atmospheric model (and associated resolution, parameterizations, systematic biases, etc.) used to forecast weather conditions. The runway risk index algorithm 400 may increase prediction accuracy by reducing inaccuracies associated with the two factors. To reduce inaccuracies associated with the first factor (the initial condition accuracy), the runway risk index algorithm 400 generates predictions based on ensemble prediction system data. For example, the ensemble prediction system data may include or correspond to the ensemble prediction system data 154 of FIG. 1. In a particular embodiment, the ensemble prediction data may be received from the European Center for Medium-Range Weather Forecasting (ECMWF) ensemble prediction system (EPS). The ensemble prediction system data may include a plurality of data members each indicating a predicted cross-wind value for the first runway at the first time. In a particular embodiment, the ensemble prediction system data may include fifty forecast members (e.g., data members) and a control forecast. The fifty forecast members may be generated using a particular forecast model and fifty perturbed initial conditions. For example, each of the fifty forecast members may be a predicted weather related value using the particular forecast model based on a corresponding initial condition. The multiple forecast members may enable a determination of a probability that one or more threshold values are exceeded, as further described below.

To reduce inaccuracies based on the second factor (the atmospheric model), the runway risk index algorithm 400 generates predictions based on a set of thresholds and different probability ranges. For example, using the runway risk index algorithm 400, a plurality of probability ranges may be predicted. FIG. 4 illustrates probability ranges that correspond to one runway, to one aircraft type, and to one sub-interval. Additional probability ranges may be predicted during other sub-intervals, for other aircraft types, and/or for other runways in a similar manner. Each probability range represents probabilities that a predicted cross-wind value will exceed one or more of a set of thresholds associated with a corresponding aircraft type. The set of thresholds may be included in or determined based on aircraft safety information associated with the corresponding aircraft type. For example, the set of thresholds may be included in or determined based on the aircraft safety information 146 of FIG. 1. In particular embodiment, the set of thresholds may include or correspond to cross-wind rating thresholds associated with the corresponding aircraft type.

As illustrated in FIG. 4, a plurality of risk levels 402 are predicted based on the probability ranges (illustrated in a horizontal direction) and the set of thresholds (illustrated in a vertical direction). The plurality of data members may be compared to the set of thresholds, and a frequency (e.g., a probability) with which the plurality of data members exceeds the set of thresholds may be used to predict a first risk level associated with the first aircraft type for the first runway at the first time.

The first risk level may be predicted based on the probability (e.g., frequency) ranges. For example, the first risk level may be predicted to have a level of "slight" when 20% to 40% of the predicted cross-wind values (based on the plurality of data members of the ensemble prediction system data) exceeds a first threshold of the set of thresholds. Other risk levels may be predicted based on other percentages, as illustrated in FIG. 4. In a particular embodiment, the first risk level may be predicted based on probabilities associated with the first threshold and a second threshold of the set of thresholds, and a prediction of a minimum alert (illustrated by "min" in FIG. 4) may be determined based on probabilities associated with a third threshold of the set of thresholds. A black contour may be displayed around the first runway in the GUI 200 of FIG. 2 when the first runway is associated with a minimum alert. Accordingly, by using the set of thresholds, the runway risk index algorithm 400 may provide a more robust prediction than a prediction based on a single threshold.

Because the runway risk index algorithm 400 uses ensemble prediction system data based on a plurality of data members and a set of thresholds, instead of a single deterministic prediction value and a single threshold, the runway risk index algorithm 400 enables a more accurate prediction of risk levels than predictions based on other forecast systems.

Figure 5:
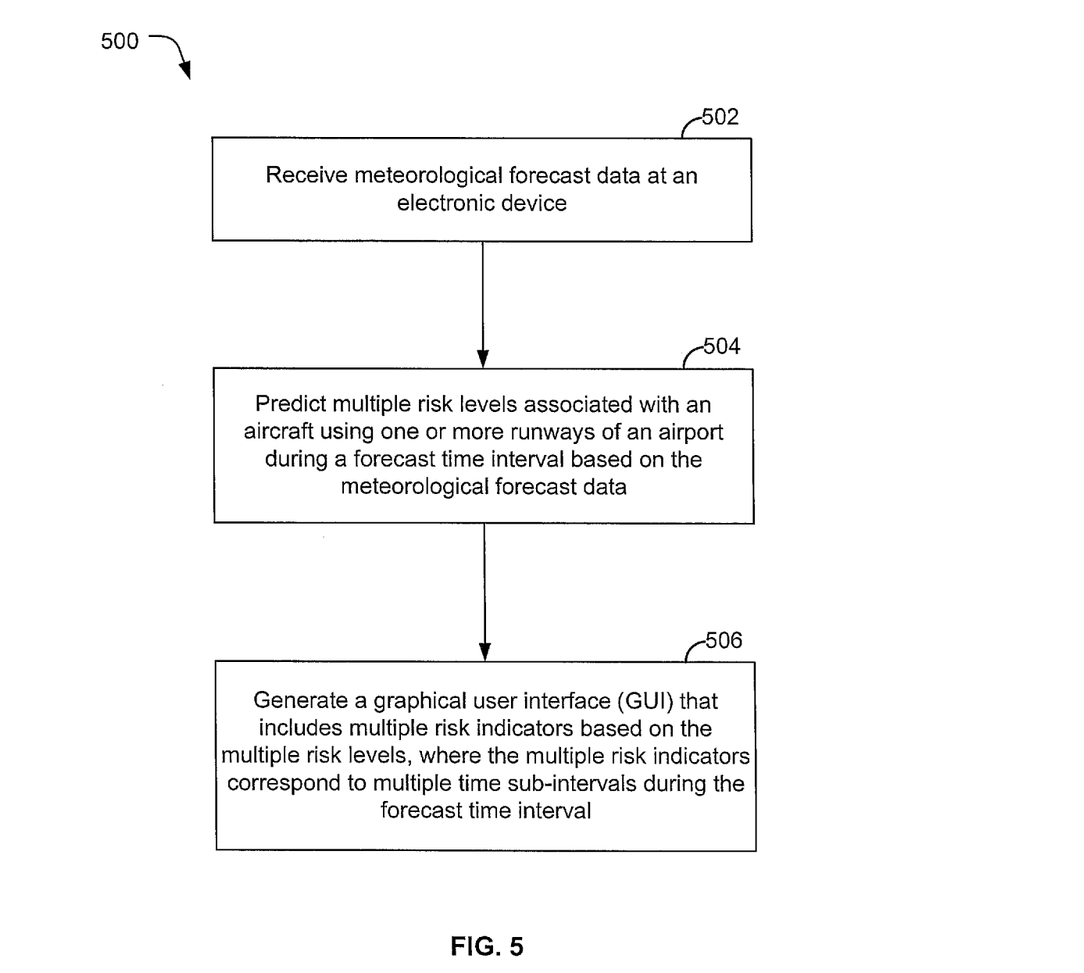
FIG. 5 is a flow chart of a particular embodiment of a method of predicting risk levels associated with airport runways.

FIG. 5 illustrates a particular embodiment of a method of predicting risk levels associated with airport runways. In a particular embodiment, the method 500 may be performed at the electronic device 100 of FIG. 1. The method 500 includes receiving meteorological forecast data at an electronic device, at 502. For example, the meteorological forecast data may include or correspond to the meteorological forecast data 142, which includes the deterministic model values 152 and the ensemble prediction system data 154, of FIG. 1.

The method 500 includes predicting multiple risk levels associated with one or more runways of an airport during a forecast time interval based on the meteorological forecast data, at 504. For example, the multiple risk levels may include or correspond to the risk levels indicated by the risk level data 144 of FIG. 1.

The method 500 further includes, at 506, generating a GUI that includes multiple risk indicators based on the multiple risk levels. For example, the GUI may include or correspond to the GUI 200 including the multiple risk indicators 210 of FIG. 2. In this example, the GUI may be generated by the electronic device 100 and displayed at the display device 120 of FIG. 1. The multiple risk indicators may correspond to multiple time sub-intervals (e.g., steps) during the forecast time interval. For example, as illustrated in FIG. 2, each of the multiple risk indicators may correspond to one of the multiple sub-intervals 220 of FIG. 2. Colors of the multiple risk indicators may indicate the risk levels associated with one or more runways of the selected airport at corresponding sub-intervals for corresponding types of aircraft, as described with reference to FIG. 2. Additionally, the forecast time interval and the multiple sub-intervals may be modifiable based on user input.

In a particular embodiment, the method 500 further includes receiving an input identifying the airport and retrieving information associated with the airport from an airport layout information database. In another particular embodiment, the method 500 further includes predicting forecasted cross-wind values for the one or more runways at the multiple sub-intervals based on the meteorological forecast data and predicting the risk levels based on the forecasted cross-wind values. A first risk level of the multiple risk levels may correspond to a first aircraft type and a second risk level of the multiple risk levels may correspond to a second aircraft type. For example, the first risk level may correspond to a first aircraft type 232 of multiple aircraft types 230, and the second risk level may correspond to a second aircraft type 234 of the multiple aircraft types 230 of FIG. 2. The method 500 may further include determining a probability that a predicted cross-wind value corresponding to a first sub-interval of the multiple sub-intervals and to a first runway of the one or more runways exceeds a threshold associated with the first aircraft type. For example, the probability may be determined using the runway risk index algorithm 400 of FIG. 4. The first risk level may correspond to the first sub-interval and to the first aircraft type and may be determined based on the probability. For example, the first risk indicator may include or correspond to the first risk indicator 212 corresponding to the first sub-interval 222 and to the first aircraft type 232 of FIG. 2. Additionally, the threshold may be based on safety information associated with the first aircraft type. The safety information may be based on data from an aircraft manual associated with the first aircraft type, user input values, or a combination thereof.

In another particular embodiment, the multiple risk indicators may include a first risk indicator corresponding to a first aircraft type and a second risk indicator corresponding to a second aircraft type. For example, the first risk indicator may include or correspond to the first risk indicator 212 and the second risk indicator may include or correspond to the second risk indicator 214 of FIG. 2. A color of the first risk indicator indicates a risk level associated with an aircraft of the first aircraft type using a particular runway during a corresponding sub-interval. The method 500 may further include receiving a runway selection indicating the particular runway. For example, the runway selection may indicate one of the runways 240-250 of the map 206 of FIG. 2 as the particular runway. The first risk indicator may correspond to the particular runway. Alternatively, the first risk indicator may correspond to a highest risk runway of the one or more runways.

In another particular embodiment, the method 500 further includes receiving an input selecting a particular risk indicator and in response to receiving the input, displaying, concurrently with the multiple risk indicators in the GUI, a map of the airport. For example, the map may include or correspond to the map 206 of FIG. 2. The map may include graphical representations of the one or more runways. Colors of the graphical representations of the one or more runways indicate runway risk levels associated with the one or more runways. For example, the map may include the graphical representations of the runways 240-250 of FIG. 2, which may be color-coded based on associated risk levels. The method 500 may further include displaying, concurrently with the map and the multiple risk indicators in the GUI, one or more deterministic cross-wind values corresponding to the one or more runways represented in the map. For example, the deterministic cross-wind values may include or correspond to the deterministic cross-wind values of the deterministic value element 208 of FIG. 2. The one or more deterministic cross-wind values may indicate cross-winds predicted to occur at the one or more runways during a first sub-interval corresponding to the particular risk indicator. The method 500 may further include displaying, concurrently with the map of the airport in the GUI, one or more other maps of one or more other airports. The one or more other maps may include graphical representations of runways at the one or more other airports, and colors of the graphical representations of the runways at the one or more other airports may indicate runway risk levels associated with the runways at the one or more other airports. For example, one or more other maps (similar to the map 206 that includes the graphical representations of the runways 240-250) may be concurrently displayed with the map 206 via the GUI 200 of FIG. 2.

In another particular embodiment, the meteorological forecast data includes deterministic meteorological model data, ensemble prediction system data, or a combination thereof. For example, the deterministic meteorological model data may include or correspond to the deterministic model values 152 and the ensemble prediction system data may include or correspond to the ensemble prediction system data 154 of FIG. 1. In another particular embodiment, the method 500 further includes performing a calibration process based on the multiple risk levels, climatological data received at the electronic device, and monitored data received at the electronic device. For example, the calibration process may include or correspond to the calibration process 320 of FIG. 3.

The method 500 may cause an electronic device to generate and display the GUI 200 of FIG. 2, thereby enabling a user to easily interpret information related to risk levels associated with an aircraft using one or more runways during multiple sub-intervals of a forecast time interval. The user may set the forecast time interval to be a target interval, including a medium-term or long-term interval, to provide a desired amount of risk level information. Thus, the method 500 may enable a user to quickly and easily observe the risk level information for use in determining a flight schedule that avoids undesirable risk levels associated with scheduled flights.

The method 500 of FIG. 5 may be initiated or controlled by a processing unit, such as a central processing unit (CPU), a digital signal processor (DSP), a controller, an application-specific integrated circuit (ASIC), a field-programmable gate array (FPGA) device, another hardware device, a firmware device, or any combination thereof. As an example, the method 500 of FIG. 5 may be initiated or controlled by one or more processors executing code (e.g., instructions stored in a memory device).

Figure 6:
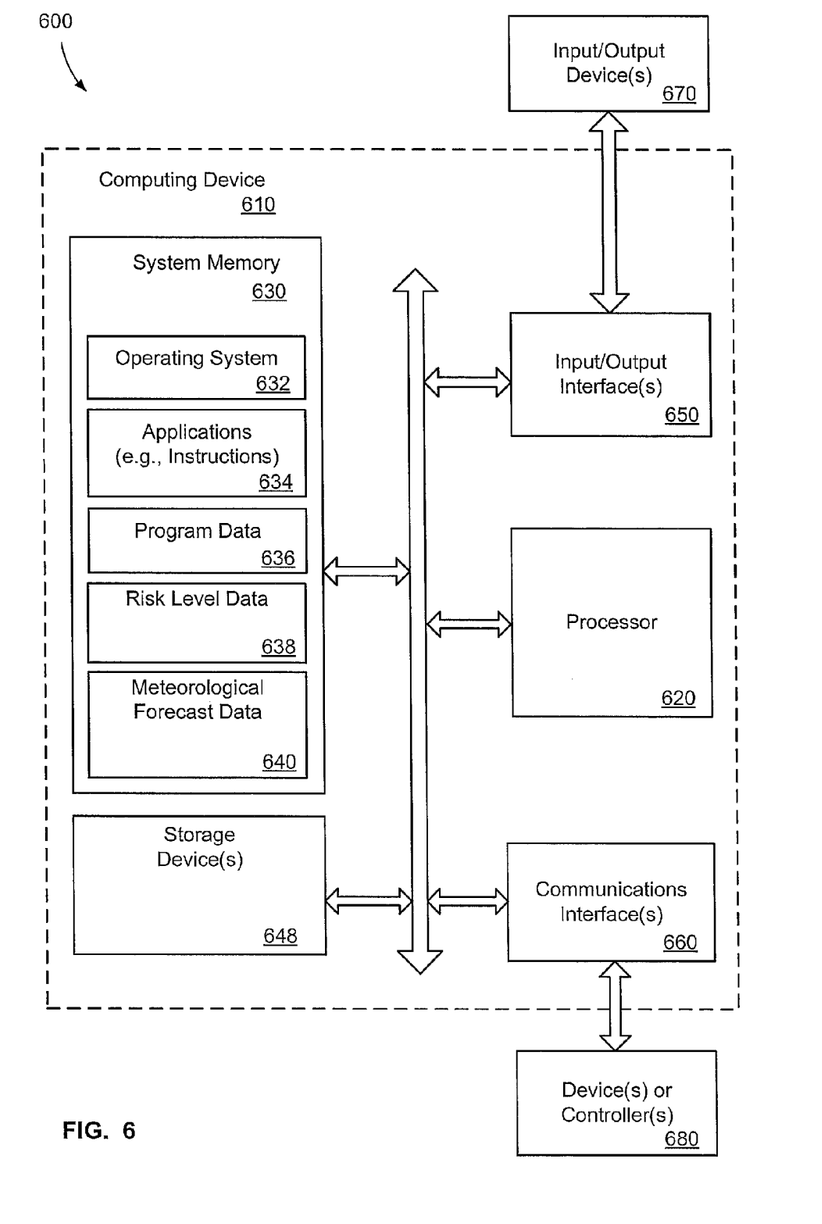
FIG. 6 is a block diagram that illustrates a particular embodiment of a computing system operable to predict risk levels associated with airport runways.

FIG. 6 is a block diagram of a computing environment 600 including a computing device 610 operable to predict risk levels associated with airport runways. For example, the computing device 610 may be included within or correspond to the electronic device 100 of FIG. 1.

The computing device 610 may include at least one processor 620. Within the computing device 610, the at least one processor 620 may communicate with a system memory 630, one or more storage devices 648, one or more input/output interfaces 650, one or more communications interfaces 660, or a combination thereof.

The system memory 630 may include volatile memory devices (e.g., random access memory (RAM) devices), nonvolatile memory devices (e.g., read-only memory (ROM) devices, programmable read-only memory, and flash memory), or both. The system memory 630 may include an operating system 632, which may include a basic input/output system for booting the computing device 610 as well as a full operating system to enable the computing device 610 to interact with users, other programs, and other devices. The system memory 630 may also include one or more applications (e.g., instructions) 634 and program data 636. The program data 636 may include data used by the applications 634 to perform respective functions of the applications 634. The applications 634 may include instructions executable by the at least one processor 620 to operate or control prediction of runway risk levels at an electronic device, such as the electronic device 100 of FIG. 1.

The one or more storage devices 648 may include nonvolatile storage devices, such as magnetic disks, optical disks, or flash memory devices. The storage devices 648 may include both removable and non-removable memory devices. In a particular embodiment, the storage devices 648 may be configured to store the operating system 632, the applications 634, the program data 636, risk level data 638, meteorological forecast data 640, or a combination thereof. The system memory 630 and the storage devices 648 are physical devices and are not a signal.

In a particular embodiment, the at least one processor 620 is configured to execute computer executable instructions, such as the applications 634, stored at the system memory 630. The instructions may be executable to cause the at least one processor 620 to perform operations. The operations may include receiving the meteorological forecast data 640. The meteorological forecast data 640 may include deterministic model values and ensemble prediction system data, such as the deterministic model values 152 and the ensemble prediction system data 154 of FIG. 1. The operations may include predicting multiple risk levels associated with an aircraft using one or more runways of a selected airport during a forecast time interval based on the meteorological forecast data and storing the multiple risk levels as the risk level data 638. For example, the risk level data 638 may include or correspond to the risk level data 144 of FIG. 1.

The operations may further include generating a GUI that includes multiple risk indicators based on the risk level data 638. For example, the multiple risk indicators may include or correspond to the multiple risk indicators 210 in the GUI 200 of FIG. 2. The multiple risk indicators may correspond to multiple sub-intervals during the forecast time interval.

The one or more input/output interfaces 650 may enable the computing device 610 to communicate with one or more input/output devices 670 to facilitate user interaction. For example, the one or more input/output interfaces 650 may be adapted to receive input from a user, to receive input from another computing device, or a combination thereof. The input/output interfaces 650 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input/output devices 670 may include user interface devices and displays, including some combination of buttons, keyboards, pointing devices, displays, speakers, microphones, touch screens, and other devices. The processor 620 may detect interaction events based on user input received via the input/output interfaces 650. Additionally, the processor 620 may send a display to a display device via the input/output interfaces 650.

The one or more communications interfaces 660 may enable the computing device 610 to communicate with one or more other computing devices or controllers 680. The one or more communications interfaces 660 may include wired Ethernet interfaces, Institute of Electrical and Electronics Engineers (IEEE) 802 wireless interfaces, Bluetooth communication interfaces, electrical (or power line) interfaces, optical or radio frequency interfaces, or other wired or wireless interfaces. The other computer devices or controllers 680 may include host computers, servers, workstations, portable computers, telephones, tablet computers, or any other communication device or component.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. A method comprising:
   receiving meteorological forecast data at an electronic device;
   predicting multiple risk levels associated with a plurality of aircraft for multiple runways of an airport during a forecast time interval based on the meteorological forecast data and aircraft cross-wind rating threshold data, wherein the multiple risk levels include a cross-wind risk level; and
   generating a graphical user interface (GUI) that includes multiple risk indicators for each aircraft of the plurality of aircraft based on the multiple risk levels, wherein the multiple risk indicators correspond to multiple time sub-intervals during the forecast time interval, and wherein the multiple risk indicators comprise graphical risk indicators.

2. The method of claim 1, wherein the forecast time interval and the multiple time sub-intervals are modifiable based on user input, and wherein the forecast time interval includes a time at least one day in the future from a time of receipt of the meteorological forecast data.

3. The method of claim 1, further comprising:
   receiving an input identifying the airport; and
   retrieving information associated with the airport from an airport layout information database.

4. The method of claim 1, further comprising:
   predicting cross-wind values for the multiple runways at the multiple time sub-intervals based on the meteorological forecast data; and
   predicting the multiple risk levels further based on the predicted cross-wind values, wherein a first risk level of the multiple risk levels corresponds to a first aircraft type, and wherein a second risk level of the multiple risk levels corresponds to a second aircraft type.

5. The method of claim 4, further comprising determining a probability that a predicted cross-wind value corresponding to a first time sub-interval of the multiple time sub-intervals and corresponding to a first runway of the multiple runways exceeds a threshold associated with the first aircraft type, wherein the first risk level corresponds to the first time sub-interval and to the first aircraft type, and wherein the first risk level is determined based on the probability.

6. The method of claim 5, wherein the threshold is based on safety information associated with the first aircraft type, and wherein the safety information is based on data from an aircraft manual associated with the first aircraft type, user input values, or a combination thereof.

7. The method of claim 1, wherein the multiple risk indicators include a first risk indicator corresponding to a first aircraft type and a second risk indicator corresponding to a second aircraft type, and wherein a color of the first risk indicator indicates a first risk level.

8. The method of claim 7, further comprising receiving a runway selection indicating a particular runway, wherein the first risk level corresponds to the particular runway, to the first aircraft type, and to a first time sub-interval.

9. The method of claim 7, wherein the first risk level corresponds to a highest risk runway of the multiple runways during a first time sub-interval.

10. The method of claim 1, further comprising:
receiving an input selecting a particular risk indicator, and
in response to receiving the input, displaying, concurrently with the multiple risk indicators in the GUI, a map of the airport, wherein the map includes graphical representations of the multiple runways, and wherein colors of the graphical representations of the multiple runways indicate runway risk levels associated with the multiple runways.

11. The method of claim 10, wherein the particular risk indicator corresponds to a first type of aircraft and a first time sub-interval, and wherein the runway risk levels identify risks associated with a first aircraft of the first aircraft type using a particular runway of the multiple runways during the first time sub-interval.

12. The method of claim 10, further comprising displaying, concurrently with the map and the multiple risk indicators in the GUI, one or more deterministic cross-wind values corresponding to the multiple runways represented in the map, wherein the one or more deterministic cross-wind values indicate cross-winds predicted to occur at the multiple runways during a first time sub-interval corresponding to the particular risk indicator.

13. The method of claim 10, further comprising displaying, concurrently with the map of the airport in the GUI, one or more other maps of one or more other airports, wherein the one or more other maps include graphical representations of runways at the one or more other airports, and wherein colors of the graphical representations of the runways at the one or more other airports indicate runway risk levels associated with the runways at the one or more other airports.

14. The method of claim 1, further comprising performing a calibration process based on the multiple risk levels, climatological data received at the electronic device, and monitored data received at the electronic device.

15. An apparatus comprising:
a processor, and
a memory coupled to the processor, the memory storing instructions that, when executed by the processor, cause the processor to perform operations comprising:
receiving meteorological forecast data;
predicting multiple risk levels associated with a plurality of aircraft for multiple runways of an airport during a forecast time interval based on the meteorological forecast data and aircraft cross-wind rating threshold data, wherein the multiple risk levels include a cross-wind risk level; and
generating a graphical user interface (GUI) that includes multiple risk indicators for each aircraft of the plurality of aircraft based on the multiple risk levels, wherein the multiple risk indicators correspond to multiple time sub-intervals during the forecast time interval, and wherein the multiple risk indicators comprise graphical risk indicators.

16. The apparatus of claim 15, wherein the GUI includes a grid display element, wherein labels of multiple aircraft types are displayed in a first direction of the grid display element, wherein labels of the multiple time sub-intervals are displayed in a second direction of the grid display element, and wherein a first color of a first risk indicator of the multiple risk indicators indicates a first risk level corresponding to a first aircraft type of the multiple aircraft types and a first time sub-interval of the multiple time sub-intervals.

17. A non-transitory computer-readable storage device storing instructions that, when executed by a processor, cause the processor to perform operations comprising:
receiving meteorological forecast data at an electronic device;
predicting multiple risk levels associated with a plurality of aircraft for multiple runways of an airport during a forecast time interval based on the meteorological forecast data and aircraft cross-wind rating threshold data, wherein the multiple risk levels include a cross-wind risk level; and
generating a graphical user interface (GUI) that includes multiple risk indicators for each aircraft of the plurality of aircraft based on the multiple risk levels, wherein the multiple risk indicators correspond to multiple time sub-intervals during the forecast time interval, and wherein the multiple risk indicators comprise graphical risk indicators.

18. The non-transitory computer-readable storage device of claim 17, wherein a first risk level of the multiple risk levels indicates a risk to a first aircraft of a first aircraft type using a particular runway of the multiple runways during a first time sub-interval of the multiple time sub-intervals.

19. The non-transitory computer-readable storage device of claim 17, wherein the meteorological forecast data includes deterministic meteorological model data, ensemble prediction system data, or a combination thereof.

20. The method of claim 1, wherein the multiple risk levels are predicted based further on cross-wind probability ranges, and wherein the GUI includes a timeline displaying the graphical risk indicators.

* * * * *